UNITED STATES PATENT OFFICE 2,085,086

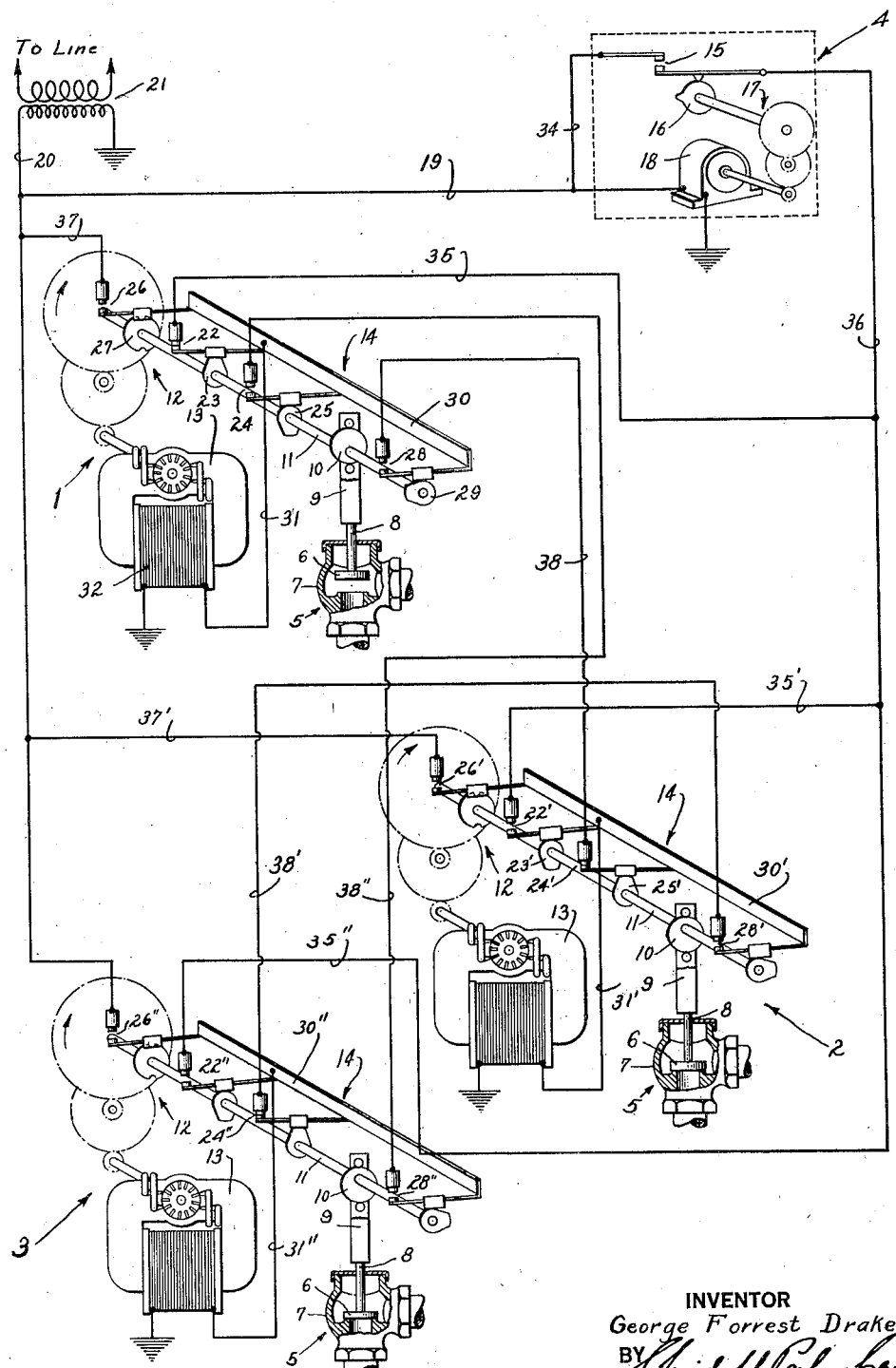

CONTROL SYSTEM FOR ELECTRICALLY OPERATED DEVICES

George Forrest Drake, Rockford, Ill., assignor to Howard D. Colman, Rockford, Ill.

Application September 14, 1934, Serial No. 744,031

4 Claims. (Cl. 172—239)

The invention pertains to a system of control for effecting the operation of a plurality of electrically operated devices in accordance with a predetermined plan or program.

One object of the invention is to provide a control system of the character indicated in which any desired number of devices may be placed in operation in a predetermined order under the control of a master controller of an extremely simple character.

A further object is to provide a control system in which a plurality of electrically operated devices are actuated in a preconcerted manner under the control of a master controller the construction and operation of which is independent of the number of devices to be controlled.

As shown in the drawing and hereinafter particularly described, the invention is applied to the control of a series of electrically operated valves in a predetermined order, the arrangement being such that as an incident to the closing of one valve of the series, the next succeeding valve is opened. The valves are placed in operation one at a time and for a given period as may be desirable, for example, in controlling the supply of water to a large lawn sprinkling system where for the sake of economy, the supply line is so limited in its capacity as to be incapable of furnishing an adequate supply of water to more than one or two sprinklers at a time. It will be understood, however, that my improved system is susceptible of other uses and that the present disclosure is to be taken as illustrative only of one embodiment of the invention.

In the drawing, the figure is a schematic view of a control system having three valve operators and a master controller, each operator having a motor driven actuator and an associated controlling switch mechanism shown in perspective for the sake of clearness. The operators are in general of the construction and arrangement shown in the patent to H. D. Colman and D. J. Stewart, No. 1,903,229, dated March 28, 1933, to which reference may be made for a more thorough understanding.

As herein shown, the system comprises electrically driven valve operators, 1, 2 and 3, and an intermittently acting master controller 4. Each operator is applied to the actuation of a valve 5 having a valve member 6 arranged for endwise movement toward and from a seat in a valve casing 7, and to this end the valve member has an actuating stem 8 operatively associated with an electrically driven actuator. Thus the stem 8 is equipped with a follower 9 coacting with a cam 10 on a shaft 11, and the latter is driven through reduction gearing 12 by means of a small electric motor 13 of the shaded pole induction type. Under the control of a switch mechanism associated with the shaft 11 and generally designated 14, each actuator is driven through successive cycles to impart opening and closing movements to the valve member, the operation being interrupted at the end of each cycle.

In the present embodiment, the master controller 4 has a single control switch 15 adapted to be closed for a short time at predetermined intervals by a cam 16 driven through reduction gearing 17 by means of an electric motor 18, which latter may be of the synchronous type. The motor is driven constantly, in the present instance, power being supplied to one terminal of the motor by a conductor 19 connected with a low voltage supply line 20 which leads from one side of the secondary of an alternating current transformer 21. The other motor terminal and the other side of the secondary transformer are grounded as indicated.

As herein shown, the master controller is adapted to cooperate with the associated switch mechanism 14 of each valve. However, the controller is effective to initiate the closing cycle only, and during such closing cycle of one valve, the next succeeding valve of the series is operated through its opening cycle so as to be conditioned for control in the next operation of the master controller. In the drawing, the valve of operator 1 is shown open so that the master controller is first effective only as to this valve.

Referring now to operator 1, the switch mechanism 14 thereof comprises a closing start switch 22 actuated by a single lobed cam 23; an opening start switch 24 actuated by a single lobed cam 25 but diametrically opposed to the cam 23; a running switch 26 actuated by a cam 27 having diametrically opposed notches in its periphery; and a conditioning switch 28 actuated by a single lobed cam 29. All of said cams are fixed on the shaft 11 and cooperate with suitable followers on movable contact arms of the respective switches, and said movable contacts are made electrically common by connection with a conductor bar 30 which is also connectd by a conductor 31 to one side of the winding 32 of the motor 13, the other side of the winding being grounded.

The master control switch 15 has its stationary contact connected by a conductor 34 with the conductor 19 leading to the motor 18; and the fixed contact of the closing start switch 22 of operator 1 is connected by a conductor 35 leading to a conductor 36 which, in turn, leads from the movable contact of the master control switch 15. It will be seen that with the closing start switch 22 closed as shown, closure of the master control switch 15 will effect a supply of current to the motor 13 of operator 1, the circuit being through conductors 19, 34, the switch 15, conductors 36 and 35, switch 22, bar 30, and conductor 31. After the motor has been started, the running switch 26, having its fixed contact connected by a conductor 37 to the supply line 20, continues the motor in operation, the closing cycle terminating after 180 degrees of operation of the shaft 11 by the opening of the running switch.

Operator 2 is like operator 1 and therefore, it will suffice to say that it comprises a closing start switch 22' and opening start switch 24', a running switch 26' and a conditioning switch 28'. Likewise, operator 3 has a closing start switch 22'', an opening start switch 24'', a running switch 26'', and a conditioning switch 28''. Conductors 35' and 35'' lead respectively from conductor 36 to the fixed contacts of closing start switches 22' and 22''; and the fixed contacts of running switches 26' and 26'' are respectively connected with the supply conductor 20, the former through a conductor 37' and the latter directly. The motors of operators 2 and 3 are respectively connected to the conductor bars 30' and 30'' by means of conductors 31' and 31''.

During the closure of the valve of operator 1, the valve of operator 2 is opened so as to be placed in operation and at the same time conditioned for closure in the next operation of the master controller. Such opening cycle of operator 2 is effected by the cooperation of the switch mechanism 14 of operator 2 and conditioning switch 28 of operator 1.

Thus opening start switch 24' of operator 2 even though closed as shown, is effective to initiate an opening cycle only in conjunction with the conditioning switch 28 of operator 1, and then, only during the closing cycle thereof. To this end, the fixed contact of opening start switch 24' of operator 2 is connected by a conductor 38 with the fixed contact of conditioning switch 28 of operator 1. Accordingly, during the closing cycle of operator 1, switch 28 is closed by its cam 29, completing a circuit from line 20 to the motor of operator 2 through conductor 37, running switch 26, bar 30, switch 28, conductor 38, switch 24', bar 30' of operator 2 and conductor 31'.

Similarly, the fixed contact of opening start switch 24'' of operator 3 is connected by a conductor 38' with the fixed contact of conditioning switch 28' of operator 2; and the fixed contact of opening start switch 24 of operator 1 is connected by a conductor 38'' with the fixed contact of conditioning switch 28'' of operator 3.

The operation of the system may now be summarized, it being assumed that the parts are in the relation shown in the drawing, with the valve of operator 1 in open position and the valves of the other two operators closed. At a predetermined time master switch 15 is closed by the operation of the motor driven cam 16 and the circuit to the motor of operator 1 is completed through conductor 31, bar 30, closing start switch 22, conductors 35 and 36, switch 15, and conductors 34 and 19 to the supply conductor 20. During the ensuing closing cycle of operator 1, conditioning switch 28 is closed as is also the running switch 26. Also, at this time, starting switch 24' of operator 2 is closed. Accordingly, the starting circuit to the motor of operator 2 is completed as follows: Conductor 31' of operator 2, bar 30', opening start switch 24', conductor 38, conditioning switch 28 of operator 1, bar 30, running switch 26 and conductor 37.

When the master switch 15 is again closed, the valve of operator 2 is started through its closing cycle, and during this operation, the valve of operator 3 moves through its opening cycle. The starting circuit to the motor of operator 2 in such closing operation is completed through closing start switch 22' in series with the master control switch 15; and in the initiation of the opening cycle of operator 3, the circuit to its motor is completed through opening start switch 24'' and conditioning switch 28' of operator 2.

Likewise when the master control switch is again operated, operator 3 moves through a closing cycle, the starting circuit being completed through closing start switch 22'' and master control switch 15; and during this cycle, the valve of operator 1 is started toward open position through the operation of conditioning switch 28'' of operator 3 and opening start switch 24 of operator 1.

It will be evident that near the end of the opening cycle of each operator its closing start switch is closed, so that in order to insure that the operators will not start on their closing cycles it is, of course, necessary that the switch 15 of the master controller be so arranged as to open in advance of the closure of the closing start switches 22, 22' and 22''. Also, it will be understood that after the starting operation, the circuit to the motor is continued in each instance by the running switch which operates to terminate the cycle automatically.

From the foregoing it will be apparent that the operation of a plurality of electrically driven devices in a preconcerted manner may be effected with a master controller of a very simple character. Of primary importance in the attainment of this result is the conditioning switch means of one operator coacting with the controlling switch mechanism of another operator and serving to prepare the latter for operation by the master control switch, whereby, the construction and operation of the master controller is rendered independent of the number of devices controlled thereby.

I claim as my invention:

1. In an electrical control system, in combination, a series of electrically driven devices each including a rotary control member operable in cycles and a switch mechanism actuated by said member in its rotation, a master controller common to said devices, and circuit connections interconnecting said devices and said master controller for operating the devices successively, said circuit connections being controlled by the switch mechanisms of the respective devices so that the control members of the devices are operated through successive cycles under control of said master controller and the preceding device of the series alternately.

2. In an electrical control system, in combination, a series of control devices to be operated in succession, each of said devices comprising a control member and an electrically driven actuator operable in cycles to impart two distinctive movements to the member, a periodically operating timing means arranged for coaction with the several devices in succession to initiate the operations of the actuators through one cycle, and means controlled by each of said actuators in its operations through said one cycle for initiating the other operating cycle of the actuator of the succeeding device in the series.

3. In an electrical control system, in combination, a series of control devices each including a control member operable in cycles, a master controller common to the several devices, and circuit connections controlled by said devices for operatively associating the master controller with said devices successively and for rendering the devices controllable in alternate cycles by the master controller and the preceding device of the series respectively.

4. In an electrical control system, in combination, a master controller, a series of control devices each including a control member operable in cycles, said devices being initiated in operation in one cycle by said master controller and in the succeeding cycle by an adjacent control device independently of the master controller, and circuit connections controlled by said devices for associating the devices with said master controller for successive operation.

GEORGE FORREST DRAKE.